Nov. 7, 1939.　　　　　L. F. CARTER　　　　　2,178,623

STABILIZING MEANS FOR LANDING FIELD CHARTS

Filed July 9, 1937　　　　2 Sheets-Sheet 1

INVENTOR
LESLIE F. CARTER
BY
Herbert H. Thompson
HIS ATTORNEY.

Nov. 7, 1939.　　　　　L. F. CARTER　　　　　2,178,623
STABILIZING MEANS FOR LANDING FIELD CHARTS
Filed July 9, 1937　　　2 Sheets-Sheet 2
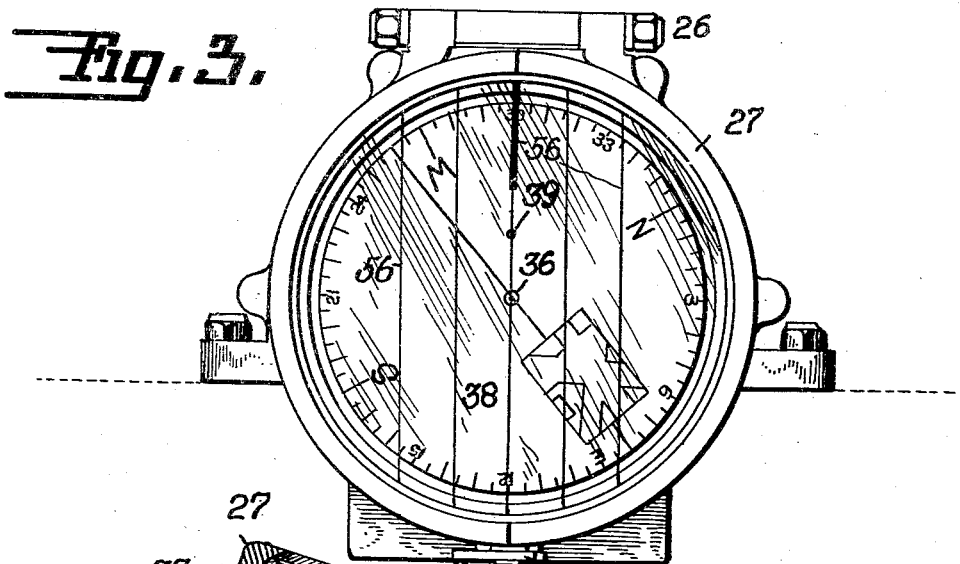
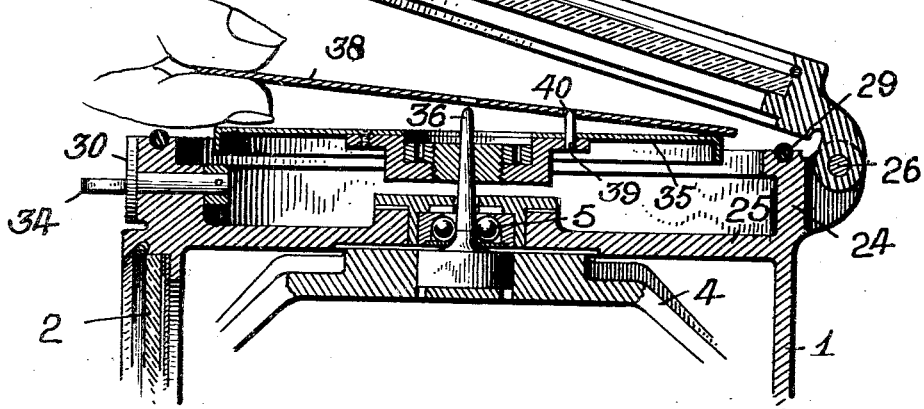
INVENTOR
LESLIE F. CARTER
BY
HIS ATTORNEY.

Patented Nov. 7, 1939

2,178,623

UNITED STATES PATENT OFFICE 2,178,623

STABILIZING MEANS FOR LANDING FIELD CHARTS

Leslie F. Carter, Leonia, N. J., assignor to Sperry Gyroscope Company, Inc., Brooklyn, N. Y., a corporation of New York Application July 9, 1937, Serial No. 152,673

3 Claims. (Cl. 33—204)

This invention relates to a means for aiding aircraft in landing at a landing field, especially during low visibility. More particularly, my invention constitutes an improvement in the prior device of this character disclosed in the patent to Horace Stark, No. 2,069,285, dated February 2, 1937, for Orientation device.

In brief, my invention consists in an attachment for or modification of a standard directional gyroscope or similar device, whereby a detachable map of a landing field may be placed thereon at will with a minimum disturbance of or damage to the gyroscope and with a minimum effort on the part of the aviator.

My invention also has application to vacuum driven gyroscopes in general, having caging or locking devices.

Referring to the drawings, showing the preferred form of my invention,

Fig. 3 is a plan view of the device, showing the map in position.

Fig. 4 is a vertical section of the upper portion of the device, showing the cover raised for inserting or replacing the map or card.

Figure 1:
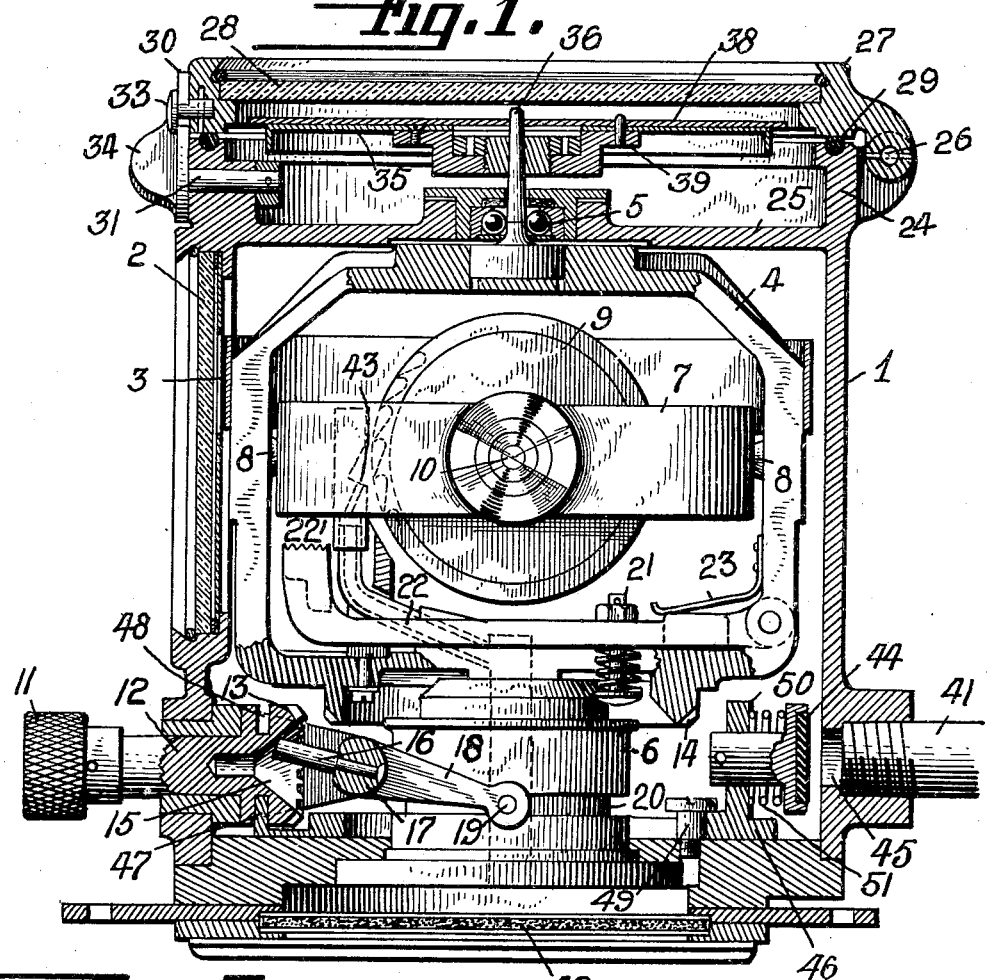
Fig. 1 is a vertical section, partly in elevation, of a directional gyroscope with my attachment applied thereto.
Figure 2:
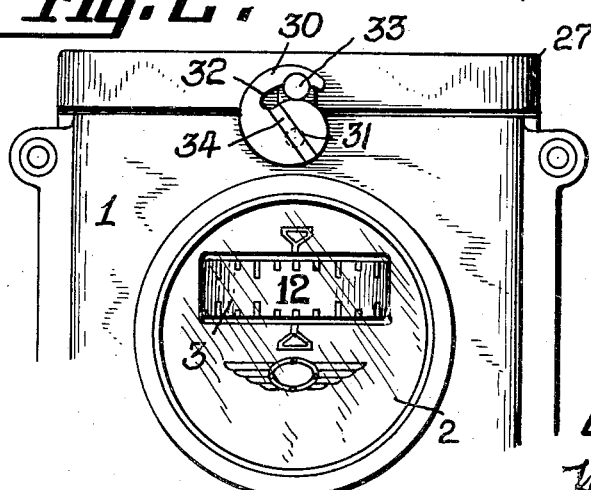
Fig. 2 is a front elevation of the upper portion of the same.

The directional gyroscope shown may be of standard construction and is shown as comprising an outer casing 1 having a front window 2 through which the compass card 3 on the vertical ring 4 is visible. Within the housing, the vertical ring 4 is mounted for rotation about a vertical axis by means of upper bearing 5 and a lower bearing, concealed within locking sleeve 6. The rotor bearing ring or frame 7 is mounted for oscillation about a horizontal axis 8—8 in said ring, the rotor 9 being shown as journaled therein on normally horizontal spin axis 10.

The gyroscope is shown as of the air spun type and the usual locking means is provided for resetting the gyroscope, the details of which are more completely brought out in my prior patent, joint with B. G. Carlson, No. 2,052,866, dated September 1, 1936, for Pilot directing gyroscopes. Differential air pressure for spinning the gyroscope is preferably provided by a vacuum system in which air is continuously withdrawn from the case through pipe 41 by a pump or Venturi tube (not shown), the air entering the case through an air filter 42 at the bottom and passing up through hollow bearings, as well understood in the art and indicated in dotted lines which lead to nozzle 43.

The locking and resetting device for such gyroscopes usually consists of a knob 11 which is both rotatable and longitudinally movable. Said knob is secured to a shaft 12 having on its inner end a bevel gear 13 adapted to mesh with an annular bevel gear 14 on the bottom of the vertical ring, when the knob is pushed inwardly. At the same time the walls of the cone shaped cavity 15 in the interior of gear 13 engages a pin 16 secured to cross shaft 17, which carries a fork 18 having pins 19 engaging a groove 20 in the sleeve 6, so that said sleeve is raised at the time the knob is pushed in. The raising of said sleeve brings the top thereof into contact with and also lifts an intermediate pin 21 depending from a locking arm 22, the upper surface of which 22' engages the under surface of the rotor bearing frame 7 to lock the gyroscope about its horizontal axis. The gyroscope may then be readily turned about its vertical axis by turning knob 11, which rotates the vertical ring through the intermeshing gears 13, 14. The locking arm 22 is yieldingly held in its downward position by leaf spring 23.

To apply a detachable card to such a gyroscope presents serious difficulties, since the gyroscope is sealed within an air-tight casing 1. In carrying out my invention, I extend the upper pivot pin 36 on the vertical ring through the top of casing 1 to receive the detachable card or map 38. To receive the card, I have shown the casing 1 as provided with an extension 24 above the top 25 thereof, and to said extension I hinge at 26 a cover 27 having a transparent top 28. Said cover is normally clamped tightly down on the extension 24, a rubber seal 29 being provided for this purpose, so that the casing is air-tight when the cover is closed, in spite of the hole through which pin 36 projects. To this end, a camming lock 30 pivoted at 31 at the front of the instrument may be provided, the cam slot 32 of which engages a pin 33 extending from the cover 27, and draws it tightly down on the rubber gasket 29, a thumb piece 34 being provided for turning the lock.

In practice, I mount a disc 35 on said stem 36 extending upwardly from the vertical ring 4 through the bearing 5. Said disc is adapted to receive the small map or diagram 38 of the landing field which is being approached, the diagram being held in proper relationship by an offset pin 39 extending from the disc through a hole 40 in the map, the map being also provided with a central hole to receive the pin 36. Suitable reference markings 56 may be provided on the under surface of glass cover 28.

When the cover is raised to replace a card, as shown in Fig. 4, it will be apparent that air will be drawn down through the bearing 5 around the stem 36. This is objectionable for several reasons. The directional gyroscope, being very sensitive, should not have a packing gland around this stem. At the same time, if air is drawn through the bearing, dust and dirt are likely to collect therein and give rise to friction. At the same time, due to the extra inrush of air, the pump vacuum pressure may be affected. It would also be extremely difficult, if not impossible, to raise the cover 27 in order to replace the card while the interior of the casing remains connected to the vacuum pump, since the lid would have to be lifted against the outside atmospheric pressure.

It is likewise true that the gyroscope should be caged or locked prior to replacing a card by pressing knob 11 in. I therefore prefer to shut off the connection to the pump before or at the time the cover 27 is raised and incorporate the shut-off valve in the gyro-locking mechanism. To this end, I have shown a valve member or closure 44 for closing the outlet 45 leading to pipe 41, said closure being mounted on a slide plate 46 which extends around sleeve 6 and has an upturned inner end 47 engaging an annular slot 48 in the hub of gear 13. The slide is shown as guided by one or more guide pins 49 and the closure is yieldingly mounted in outer upturned end 50 of the slide, as by means of spring 51.

Therefore, when the aviator desires to change or insert a chart, he first cages the gyroscope by pushing in knob 11, thus shutting off the connection to the pump. He then unlocks catch 30, raises the lid 27, as shown in Fig. 4, and inserts the desired chart over the proper pins. He then closes and relocks the hinged top. Then the directional gyroscope is reset from his magnetic compass or radio bearings by turning the knob 11, and finally the knob is released or pulled out so that the gyro is freed and the chart will then remain fixed in azimuth during the landing operation. It then becomes a simple matter to land on the proper runway and in the proper direction, as shown by the chart and as he is advised by radio.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. A detachable card attachment for directional gyroscopes, comprising the combination with a vacuum driven directional gyroscope having a caging device operable at will, an enclosing casing and a pump connection, a valve movable to shut off communication between said casing and connection, a map card detachably mounted on said gyroscope within said casing, a manually operable closure for said casing giving access to said card, means for caging said gyroscope during replacement of the card, and means operated by said caging means for moving said valve to closed position.

2. In a gyroscope of the vacuum driven type, the combination with a casing enclosing said gyroscope, a hinged airtight cover for said casing, a card on said gyroscope which may be reached when the cover is open, said casing having a port through which the air from said casing is continuously exhausted, a locking cage for said gyroscope, and a closure connected to said cage and moved to close said port when the cage is moved to caging position.

3. A detachable card attachment for directional gyroscopes, comprising the combination with a vacuum driven directional gyroscope having a caging device operable at will, an enclosing casing having a vacuum pump connected thereto, a valve in said casing movable to shut off communication between said casing and said connection, a map card detachably mounted on said gyroscope within said casing, an air-tight cover for said casing giving access to said card and a knob outside of said casing and connected to said valve for moving said valve to closed position so that said cover may be readily lifted to replace a card.

LESLIE F. CARTER.